No. 803,011. PATENTED OCT. 31, 1905.
C. MOTZ.
TIRE FOR VEHICLE WHEELS.
APPLICATION FILED JAN. 3, 1905.
Fig. 1.
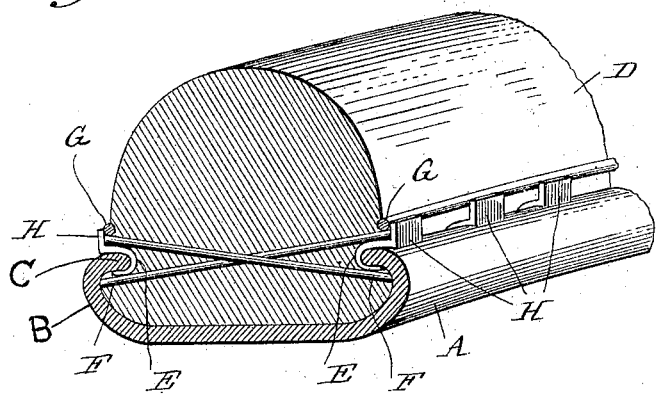
Fig. 2. Fig. 3.
 
Witnesses
Edwin L. Yewell
Alexander S. Stewart
Inventor
Charles Motz
By Church & Church
his Attorneys
ANDREW. B. GRAHAM CO., PHOTO-LITHOGRAPHERS, WASHINGTON, D. C.

UNITED STATES PATENT OFFICE.

CHARLES MOTZ, OF AKRON, OHIO.

TIRE FOR VEHICLE-WHEELS.

No. 803,011.     Specification of Letters Patent.     Patented Oct. 31, 1905.

Application filed January 3, 1905. Serial No. 239,529.

*To all whom it may concern:*

Be it known that I, CHARLES MOTZ, residing at Akron, in the county of Summit and State of Ohio, have invented certain new and useful Improvements in Tires for Vehicle-Wheels; and I do hereby declare the following to be a full, clear, and exact description of the same, reference being had to the accompanying drawings, forming a part of this specification, and to the letters of reference marked thereon.

This improvement relates to vehicle-tires; and the improvement consists in the construction of the tire and the means for securing the tire to the rim of a wheel.

One object of the invention is so to arrange a stiffening means within the tire that it can be efficiently and readily fastened to a channel of a wheel.

A further object is to provide a simple and highly-efficient means whereby the elastic tread portion will be securely held to the channel of a wheel.

Great difficulty has been experienced in the systems now prevailing in fastening solid or cushion tires in wheel-channels of the clencher type as now made and used, and especially in that class where wires are used within the tire as a retaining means, the present stock channels as now made and used being too shallow vertically in cross-section to allow sufficient rubber within the channel-rim to securely hold the tire within the rim under strain. Should channels of a greater depth be used, the desirable resilient qualities would be greatly impaired, due to the larger amount of confined rubber in the channel, and there would be also a corresponding increase in cost of construction. The present invention overcomes these difficulties in a very simple and efficient manner, it allows stock channels to be used, and it gives the greatest retaining strength to the minimum amount of rubber confined within the channel-rim, thereby effecting a saving of weight and cost of construction.

The invention consists in certain novel details of construction and combinations and arrangements of parts, all as will be now described, and pointed out in the appended claims.

In the accompanying drawings, Figure 1 is a perspective view showing an undercut channeled rim, elastic tire, and the retaining means. Fig. 2 is a perspective view of a retaining-hook. Fig. 3 is a perspective view of a retaining-hook of another form.

The letter A in the accompanying drawings indicates the rim or channel of a wheel, which is secured to the felly in any preferred manner and has upwardly-extending marginal flanges B, with inwardly-extending portions C, thereby forming an undercut channel for the tire. The tire D is preferably solid rubber and has in each side, at a suitable distance from the base, longitudinally-extending side grooves E E. Within the base of the tire, as shown in Fig. 1, are embedded cross-wires F F, alternately arranged, one end of said wires F F extending under the inturned flanges of the rim C C and the other ends of said wires extending over or above the inturned flanges of the rim on opposite sides thereof.

In order to more effectually secure the tire D to the channel-rim, circumferential metal wires or bands G G are placed on the outside of the tire and over the ends of the transverse wires F F. In order to prevent outward lateral displacement of the circumferential wires, metal hooks H with upwardly-extending portions are hooked on the inturned flanges of the rim A A and there held in position by pressure of the tire D.

In lieu of the circumferential wires G G on the outside of the elastic tire over the cross-wires F F used as a retaining means, as shown in Fig. 1, metallic hooks H′, preferably S-shaped in form, as shown in Fig. 2, may be employed with good effect as a retaining means for the tire. One end of said hooks is hooked on the inturned flanges of the rim and the other ends thereof engage the ends of the transverse wires in the rubber tire.

It will be seen, as shown in Fig. 1, that the arrangement of the cross wires or stays within the tire forms a double clencher or fastener for the tire at their points of location. It will be further seen that by the peculiar and novel arrangement of the cross-wires within the tire under a load the tire will be free to move between the spaced wires, thereby retaining to a considerable extent its natural resilient qualities.

Having thus described my invention, what I claim as my invention, and desire to secure by Letters Patent, is—

1. In a vehicle-tire, the combination with the undercut channeled rim, of the elastic tire having projections adapted to fit said channeled rim, and provided with a series of transverse bars or stays, alternately arranged, having one end of said bars terminate under the inturned flanges of the rim, and the opposite ends thereof terminate above the inturned flanges of the rim on opposite sides; substantially as described.

2. In a vehicle-tire, the combination with the undercut channeled rim, of the elastic tire having projections adapted to fit said channeled rim, metallic transverse bars or stays alternately arranged in said tire, and having one end of said bars terminating under the inturned flanges of the rim, and the other ends thereof terminate over the inturned flanges on opposite sides and engaging inturned hooks hooked on the inturned flanges of the rim; substantially as described.

3. In a vehicle-tire, the combination with the metallic rim, having upwardly and inwardly extending flanges, of the elastic tire having portions adapted to fit said channeled rim, transverse metallic bars or stays alternately arranged in said tire, and having one end of said bars projecting under the inturned flanges of the rim, and the other ends thereof terminating above the inturned flanges on opposite sides, and endless circumferential metallic bands in tension located over and bearing on the outside ends of the bars on each side of the elastic tire over the flanges of the rim; substantially as described.

4. In a vehicle-tire, the combination with the undercut channeled rim, of the elastic tire having a portion adapted to fit said rim, transverse metal bars or stays embedded in the tire above the inturned flanges of the rim, and circumferential retaining-wires placed over the ends of said wires on the outside of the elastic tire; substantially as described.

5. As an article of manufacture, an elastic vehicle-tire having projecting side portions at its base, longitudinally-extending side grooves above said projecting side portions, transverse wires alternately arranged in said tire, having one end of said wires terminating in the projecting base portions of the tire, and the other ends thereof terminating above said longitudinal side grooves, on each side of the elastic tire; substantially as described.

6. In a vehicle-wheel rim, provided with inturned edges, an elastic tire having a portion adapted to fit said rim, hooks hooked on the inturned flanges of the rim, whereby they are adapted to prevent lateral displacement of circumferential metal bands lying over the ends of transverse bars above the inturned flanges of the rim; substantially as described.

7. An elastic tire for vehicles having projecting side portions at its base adapted to seat in an undercut rim and diagonally-arranged metal stays embedded in said tire and extending from the base projections on one side of the tire to the opposite side of the tire above the projection; substantially as described.

8. In a vehicle-wheel a rim, an elastic tire mounted in the rim, diagonal metal stays embedded in the tire and extending from a point below the edge of the rim on one side diagonally outward to the opposite side of the tire in position to coöperate with means to hold the stay in place; substantially as described.

9. In a vehicle-wheel, a rim, an elastic tire mounted in the rim, diagonal metal stays embedded in the tire and extending from a point below the edge of the rim on one side diagonally outward to the opposite side of the tire at a point above the rim and detachable means for holding the latter ends of the stays; substantially as described.

10. An elastic tire for vehicles having metal stays embedded therein and extending through the base of the tire from one side to the other in intersecting diagonal planes whereby both ends of each stay are brought into position to coöperate with external securing means at the sides of the tire; substantially as described.

CHARLES MOTZ.

Witnesses:
CHAS C. BENNER,
EMMA FORST.